US011009759B2

(12) United States Patent
Wei

(10) Patent No.: US 11,009,759 B2
(45) Date of Patent: May 18, 2021

(54) TRANSPARENT DISPLAY PANEL, METHOD FOR FABRICATING THE SAME, AND DISPLAY DEVICE

(71) Applicant: BOE Technology Group Co., Ltd., Beijing (CN)

(72) Inventor: Wei Wei, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/691,676

(22) Filed: Nov. 22, 2019

(65) Prior Publication Data
US 2020/0326566 A1 Oct. 15, 2020

(30) Foreign Application Priority Data

Apr. 11, 2019 (CN) .......................... 201910287825.9

(51) Int. Cl.
G02F 1/139 (2006.01)
G02F 1/1335 (2006.01)
G02F 1/1347 (2006.01)
G02F 1/1343 (2006.01)
G02F 1/13357 (2006.01)
G02F 1/1334 (2006.01)

(52) U.S. Cl.
CPC ............ G02F 1/139 (2013.01); G02F 1/1334 (2013.01); G02F 1/13439 (2013.01); G02F 1/13471 (2013.01); G02F 1/133514 (2013.01); G02F 1/133528 (2013.01); G02F 1/133615 (2013.01)

(58) Field of Classification Search
CPC ......... G02F 1/133514; G02F 1/133528; G02F 1/13439; G02F 1/13471; G02F 1/1334; G02F 1/133615
See application file for complete search history.

(56) References Cited

U.S. PATENT DOCUMENTS

2007/0076140 A1* 4/2007 Mai .................... G02F 1/133615
349/61
2010/0171903 A1* 7/2010 Okuyama ......... G02F 1/133615
349/65
2011/0317093 A1* 12/2011 Medendorp, Jr. ..........................
G02F 1/133524
349/61
2018/0173052 A1* 6/2018 Shinohara ............ G02B 6/0051
2019/0331955 A1* 10/2019 Lee ..................... G02F 1/13306

FOREIGN PATENT DOCUMENTS

CN 106292049 B * 11/2017 ....... G02F 1/133615

* cited by examiner

Primary Examiner — Nathanael R Briggs
(74) Attorney, Agent, or Firm — Arent Fox LLP; Michael Fainberg

(57) ABSTRACT

A transparent display panel, a method for fabricating the same, and a display device are disclosed, where the transparent display panel includes a light source, an optical waveguide, a first liquid crystal layer, a first group of electrode layers, and a color rendering component, wherein the optical waveguide is on a side of the first liquid crystal layer and has its first surface comes into contact with the first liquid crystal layer; the color rendering component is on another side of the first liquid crystal layer, and configured to render a color upon being excited by light emitted by the light source; the light source is on the side surface of the optical waveguide; and the first group of electrode layers is configured to provide the first liquid crystal layer with an electric field.

17 Claims, 1 Drawing Sheet

TRANSPARENT DISPLAY PANEL, METHOD FOR FABRICATING THE SAME, AND DISPLAY DEVICE

CROSS-REFERENCE TO RELATED APPLICATION

This disclosure claims priority to Chinese Patent Application No. 201910287825.9, filed on Apr. 11, 2019, the content of which is incorporated by reference in the entirety.

TECHNICAL FIELD

The disclosure relates to the field of display technologies, and in some embodiments to a transparent display panel, a method for fabricating the same, and a display device.

DESCRIPTION OF THE RELATED ART

Transparent display devices relate to display technologies in which an image can be displayed, but also a scene behind the display device can be seen through the display device, and such new transparent display devices have been popularly favored, and enjoyed a significant share in the market. In some embodiments, both the transparency and the display uniformity have been desirable to the transparent display technologies, so the researches in the field of transparent display devices have been focused in the related art on the design of a transparent display panel with high transparency and high display uniformity.

SUMMARY

Embodiments of the disclosure provide a transparent display panel, a method for fabricating the same, and a display device.

In an aspect, the embodiments of the disclosure provide a transparent display panel including a light source, an optical waveguide, a first liquid crystal layer, a first group of electrode layers, and a color rendering component, wherein: the optical waveguide, including opposite first and second surfaces, and a side surface connected between the first and second surfaces, is on a side of the first liquid crystal layer, and has its first surface come into contact with the first liquid crystal layer; the color rendering component is on another side of the first liquid crystal layer, and configured to render a color upon being excited by light emitted by the light source; the light source is on the side surface of the optical waveguide; and the first group of electrode layers is configured to provide the first liquid crystal layer with an electric field.

In some embodiments, the color rendering component includes a photochromic layer.

In some embodiments, the light source is an ultraviolet light source.

In some embodiments, the light source is a white light source, and the color rendering component includes a color filter layer.

In some embodiments, the first group of electrode layers includes a first planar electrode and a first pixel electrode, and the first pixel electrode includes first electrode blocks arranged in an array; or the first group of electrode layers includes a plurality of first strip electrodes and a plurality of second strip electrodes, and the plurality of first strip electrodes and the plurality of second strip electrodes are intersected with each other.

In some embodiments, the first planar electrode is on a side of the second surface of the optical waveguide, and the first pixel electrode is on a side of the first liquid crystal layer facing away from the optical waveguide; or the plurality of first strip electrodes are on a side of the second surface of the optical waveguide, and the plurality of second strip electrodes are on a side of the first liquid crystal layer facing away from the optical waveguide.

In some embodiments, the first planar electrode comes into contact with the second surface of the optical waveguide, and a refractive index of the first planar electrode is lower than that of the optical waveguide; or the plurality of first strip electrodes come into contact with the second surface of the optical waveguide, and refractive indexes of the plurality of first strip electrodes are lower than that of the optical waveguide.

In some embodiments, the light source is a monochromatic light source; and the color rendering component includes a polymer dispersing liquid crystal layer and a second group of electrode layers; the second group of electrode layers is configured to provide the polymer dispersing liquid crystal layer with an electric field; and the polymer dispersing liquid crystal layer is configured to be driven by the electric field provided by the second group of electrode layers to be switched between a light scattering state and a transparent state.

In some embodiments, the second group of electrode layers includes a second planar electrode and a second pixel electrode; the second planar electrode and the second pixel electrode are on two sides of the polymer dispersing liquid crystal layer respectively, and the second pixel electrode includes second electrode blocks arranged in an array.

In some embodiments, the second electrode blocks correspond to the first electrode blocks in a one-to-one manner; and orthographic projections of the first electrode blocks onto the optical waveguide overlap with orthographic projections of their corresponding second electrode blocks onto the optical waveguide.

In some embodiments, the second group of electrode layers includes a plurality of third strip electrodes and a plurality of fourth strip electrodes; and the plurality of third strip electrodes and the plurality of fourth strip electrodes are intersected with each other, and are on two sides of the polymer dispersing liquid crystal layer respectively.

In some embodiments, the plurality of second strip electrodes, and the plurality of fourth strip electrodes are shared electrodes; and the plurality of first strip electrodes correspond to the plurality of third strip electrodes in a one-to-one manner, and orthographic projections of the plurality of first strip electrodes onto the optical waveguide overlap with orthographic projections of their corresponding third strip electrodes onto the optical waveguide.

In some embodiments, inner mirror reflecting layers are arranged on the other side surfaces of the optical waveguide than the side surface thereof arranged with the light source.

In some embodiments, the transparent display panel further includes a linear polarizer between the optical waveguide and the light source.

In some embodiments, the transparent display panel further includes: a first glass substrate between the first liquid crystal layer and the color rendering component; and a second glass substrate on a side of the color rendering component facing away from the first glass substrate.

In another aspect, the embodiments of the disclosure provide a display device including the transparent display panel according to any one of the technical solutions above.

In yet another aspect, the embodiments of the disclosure provide a method for driving the transparent display panel according to any one of the technical solutions above, the method including: while the transparent display panel is in a display state:

switching on the light source so that parallel light emitted by the light source enters the optical waveguide, and is totally reflected in the optical waveguide;

creating, by the first group of electrode layers, a first electric field to make a refractive index of the first liquid crystal layer in a set pixel region being higher than that of the optical waveguide, so that the parallel light in the optical waveguide corresponding to the set pixel region is output through the first liquid crystal layer; and rending, by the color rendering component, a color upon being excited by the light output by the first liquid crystal layer.

In some embodiments, the color rendering component includes a polymer dispersing liquid crystal layer and a second group of electrode layers; and while the transparent display panel is in the display state, the light source produces visible light in one or more of three primary colors including red, green, and blue sequentially at a set frequency in an image display period, wherein the set frequency is higher than a critical fusion frequency of human eyes.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

The technical solutions according to the embodiments of the disclosure will be described below clearly and fully with reference to the drawings in the embodiments of the disclosure. Apparently, the embodiments to be described are only a part but not all of the embodiments of the disclosure. Based upon the embodiments here of the disclosure, all of other embodiments which can occur to those ordinarily skilled in the art without any inventive effort shall come into the claimed scope of the disclosure.

Figure 1:
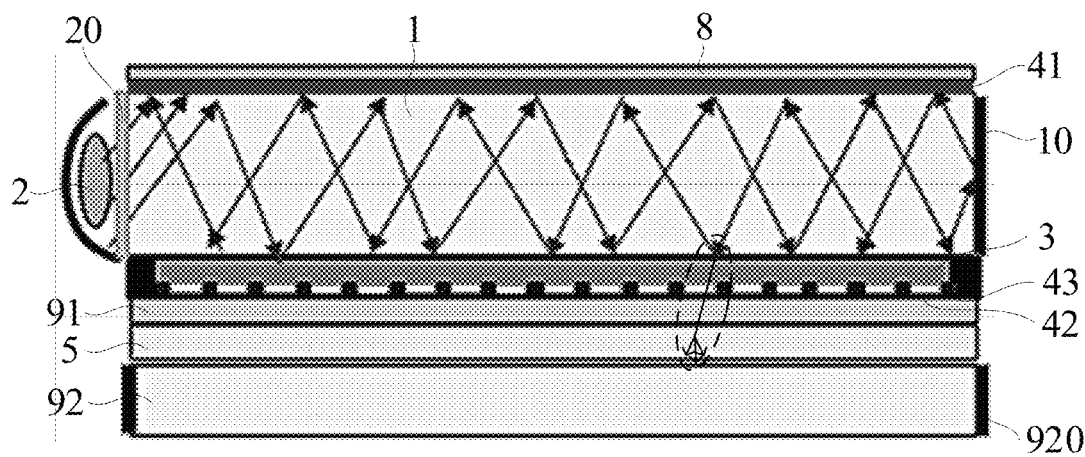
FIG. 1 a schematic structural diagram of a transparent display panel according to the embodiments of the disclosure.
Figure 2:
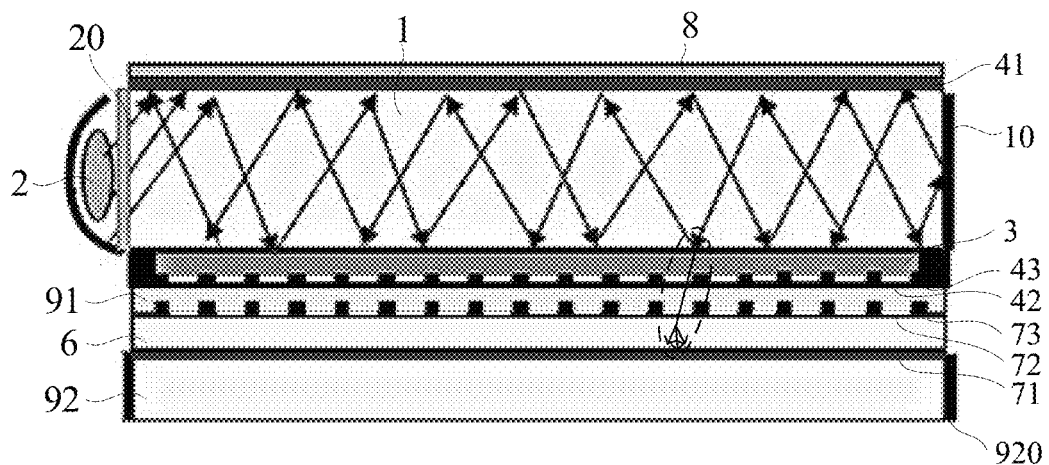
FIG. 2 is another schematic structural diagram of the transparent display panel according to the embodiments of the disclosure.
Figure 3:
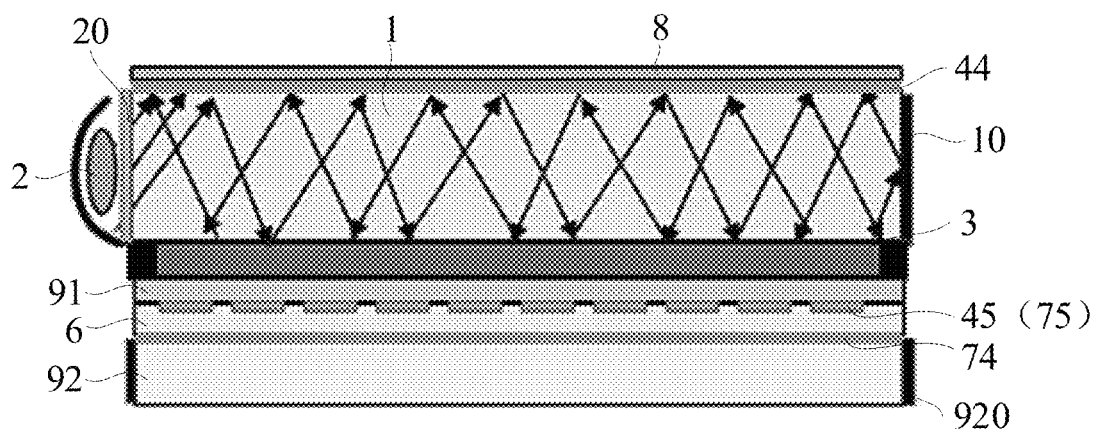
FIG. 3 is still another schematic structural diagram of the transparent display panel according to the embodiments of the disclosure.

Embodiments of the disclosure provide a transparent display panel as illustrated in FIG. 1 to FIG. 3, where the transparent display panel includes an optical waveguide 1, a light source 2, a first liquid crystal layer 3, a first group of electrode layers, and a color rendering component, where: the optical waveguide 1 includes opposite first and second surfaces, and a side surface connected between the first and second surfaces; the light source 2 is arranged on the side surface of the optical waveguide 1, and configured to produce parallel light; the first liquid crystal layer 3 is arranged on a side of the first surface of the light wave guiding 1 and in contact with the first surface, and configured so that a refractive index thereof is switched between a refractive index higher than that of the optical waveguide 1, and a refractive index lower than that of the optical waveguide 1; the first group of electrode layers is configured to provide the first liquid crystal layer 3 with an electric field so that the refractive index of the first liquid crystal layer 3 in a set pixel region is changed; and the color rendering component is located on a side of the first liquid crystal layer 3 facing away from the optical waveguide 1, and configured to be excited by the light emitted by the light source 2 to render a color.

In the transparent display panel above according to the embodiments of the disclosure, after the parallel light emitted by the light source 2 enters the optical waveguide 1, the light can be totally reflected in the optical waveguide 1 (solid lines with an arrow in FIG. 1 to FIG. 3 represent light rays in the optical waveguide 1); and the color rendering component (e.g., a photochromic layer 5 in FIG. 1) is arranged on the first surface side of the optical waveguide 1, and when the light rays exiting from the first surface of the optical waveguide 1 reaches the color rendering component, the color rendering component can be excited to render a color to thereby achieve a display effect. In some embodiments, in the transparent display panel according to the embodiments of the disclosure, the first liquid crystal layer 3 and the first group of electrode layers cooperate with each other to operate as an optical switch to control the output of the light rays in the optical waveguide 1, where the first group of electrode layers can define pixels, and provide an electric signal to control the output of the light rays in the respective pixels, for example, by controlling a varying refractive index of the first liquid crystal layer 3 in a corresponding pixel region under the following principle: the first liquid crystal layer 3 is arranged on the first surface side of the optical waveguide 1, and if the refractive index of the first liquid crystal layer 3 is changed from a lower refractive index than that of the optical waveguide 1 to a higher refractive index than that of the optical waveguide 1, then the light rays will exit from the first surface of the optical waveguide 1 instead of being totally reflected on the first surface side of the optical waveguide 1, so that the light will be output, which can be considered as switching-on of the optical switch; otherwise, the light rays will be totally reflected on the first surface of the optical waveguide 1, that is, the light rays will not exit from the first surface of the optical waveguide 1, where the optical switch is considered as to be switched off, and no light is output. In summary, with the first liquid crystal layer 3 and the first group of electrode layers, the light rays in the respective pixels can be controlled to be output to thereby decide the appearance of a display image. Further, when the light rays output from the corresponding pixel region reach the color rendering component through the first liquid crystal layer 3, a color can be rendered in a corresponding area of the color rendering component (e.g. the pixel region in the dotted circle in FIG. 1 can be the color rendering area), so that a monochromatic image can be displayed on the color rendering component.

In summary, in the transparent display panel above according to the embodiments of the disclosure, the light rays can be controlled using the optical waveguide to thereby improve the uniformity of the light rays throughout a display area; and the liquid crystals in the transparent display panel can operate as the optical switch to control the output and the propagation direction of the light, and there is no polarizer arranged in the liquid crystal optical switch, so both the display brightness and the transparency of the transparent display panel can be increased. Accordingly, the transparent display panel according to the embodiments of the disclosure can achieve a transparent display effect with high transparency, high brightness, and high display uniformity.

In some embodiments, the light source 2 includes a parallel light component configured to emit parallel light.

For example, the light source 2 can emit parallel light to the optical waveguide 1 at a drift angle of less than or equal to 45° so that the light rays enter the optical waveguide 1, and are totally reflected in the optical waveguide 1.

In some embodiments, the transparent display panel can further include a linear polarizer 20 arranged between the optical waveguide 1 and the light source 2, and configured to convert the light emitted by the light source 2 into linearly polarized light, which further enters the optical waveguide 1. In some embodiments, a polarization direction of the linearly polarized light is the same as a direction of a major axis of liquid crystal molecules when the first liquid crystal layer 3 is switched on (where the refractive index of the first liquid crystal layer 3 is higher than that of the optical waveguide 1), so a high proportion of the linearly polarized light can be transmitted through the first liquid crystal layer 3 to thereby improve the utilization ratio of the light, but also avoid such a problem that a part of nonlinearly polarized light rays may stay in the optical waveguide 1, thus resulting in high brightness of the optical waveguide 1; and on the other hand, with the linearly polarized light, light can be avoided from being leaked when the first liquid crystal layer 3 is not switched on, thereby further improves the transparency and the contrast of the transparent display panel.

In some embodiments, the optical waveguide 1 can be made of a light-guiding glass plate.

For example, the optical waveguide can be made of a glass plate with high transparency and high planarity so that the incident parallel light can be totally reflected and propagated in the waveguide.

In some embodiments, an inner mirror reflecting layer 10 can be arranged on each other side of the optical waveguide 1 than the side thereof arranged with the light source 2. For example, a vertical reflecting layer can be plated on a side surface of the optical waveguide 1 so that the parallel light reaching the side surface of the optical waveguide 1 can be reflected and further totally reflected and propagated to thereby improve the utilization ratio of the light.

In some embodiments, as illustrated in FIG. 1 and FIG. 2, the first group of electrode layers can include a first planar electrode 41 and a first pixel electrode 42, and the first pixel electrode 42 includes first electrode blocks arranged in an array. In some embodiments, the transparent display panel further includes Thin Film Transistors (i.e. TFT switches) 43 arranged in an array, corresponding to the first electrode blocks in a one-to-one manner, where each TFT switch 43 is configured to control a voltage input to a first electrode block, and to control a pixel (the smallest display unit) separately to be charged and discharged so that liquid crystals in each pixel unit are deflected to thereby change the refractive index of the liquid crystals in the pixel units. In some embodiments, the first group of electrode layers controls the first liquid crystal layer 3 under a similar principle to controlling liquid crystals in a Liquid Crystal Display (LCD) panel except that in the embodiments of the disclosure, a varying refractive index of the liquid crystals is controlled by the liquid crystal optical switches using an electric signal, and the liquid crystal optical switches need not cooperate in operation with any polarizer.

In some embodiments, as illustrated in FIG. 3, the first group of electrode layers includes a plurality of first strip electrodes 44 arranged in parallel, and a plurality of second strip electrodes 45 arranged in parallel, where the first strip electrodes 44 and the second strip electrodes 45 are arranged intersected with each other. The plurality of first strip electrodes 44 can intersect with the plurality of second strip electrodes 45 to thereby define intersection areas arranged in an array, where the intersection areas correspond to the pixel units arranged in an array, and voltage is applied to the first strip electrodes 44 and the second strip electrodes 45 to thereby control an electric field to be generated in their intersection areas, so as to change the refractive index of the liquid crystals in the pixel units corresponding to the intersection areas, thus controlling the corresponding pixel units to or not to display.

In some embodiments, the first group of electrode layers is arranged as described above so that a plurality of pixel switches can be formed to thereby control the output of light rays in the respective pixel units, so as to determine the appearance of the display image.

In some embodiments, as illustrated in FIG. 1 and FIG. 2, when the first group of electrode layers includes the first planar electrode 41 and the first pixel electrode 42, the first planar electrode 41 is arranged on a side of the second surface of the optical waveguide 1, and the first pixel electrode 42 is arranged on a side of the first liquid crystal layer 3 facing away from the optical waveguide 1. In some embodiments, the first liquid crystal layer 3 comes into contact with the optical waveguide 1, and no electrode is arranged between them, so in order to enable the first pixel electrode 42 to drive the first liquid crystal layer 3, the first planar electrode 41 can be arranged on the second surface side of the optical waveguide 1.

In some embodiments, the first planar electrode 41 can be plated directly on the second surface of the optical waveguide 1, and a refractive index of the first planar electrode 41 is lower than that of the optical waveguide 1. Since the first planar electrode 41 comes into direct contact with the second surface of the optical waveguide 1, the refractive index of the first planar electrode 41 is set lower than that of the optical waveguide 1 so that the light rays in the optical waveguide 1 can be totally reflected on the second surface to thereby avoid the light from being leaked on the second surface side of the optical waveguide 1, so as to improve the utilization ratio of the light source 2.

In some embodiments, an electrode protection layer 8 can be further plated outside the first planar electrode 41, and a refractive index of the electrode protection layer 8 can also be set lower than that of the optical waveguide 1 to thereby avoid the light from being leaked on the second surface of the optical waveguide 1.

In some embodiments, as illustrated in FIG. 3, when the first group of electrode layers includes the first strip electrodes 44 and the second strip electrodes 45, the first strip electrodes 44 can be arranged on the side of the second surface of the optical waveguide 1, and the second strip electrodes 45 can be arranged on the side of the first liquid crystal layer 3 facing away from the optical waveguide 1, or the second strip electrodes 45 can be arranged on the side of the second surface of the optical waveguide 1, and the first strip electrodes 44 can be arranged on the side of the first liquid crystal layer 3 facing away from the optical waveguide 1. Similar to the previous embodiments, no electrode can be arranged between the first liquid crystal layer 3 and the optical waveguide 1, so either of the first strip electrodes 44 and the second strip electrodes 45 will be arranged on the second surface side of the optical waveguide 1.

In some embodiments, strip electrodes (e.g., the first strip electrodes 44 as illustrated in FIG. 3) can be formed directly on the second surface of the optical waveguide 1, and in some embodiments, the refractive index of the strip electrodes is lower than that of the optical waveguide; and since the strip electrodes come into direct contact with the second surface of the optical waveguide 1, the refractive index of the strip electrodes is set lower than that of the optical waveguide 1 so that the light rays in the optical waveguide 1 can be totally reflected on the second surface to thereby avoid the light from being leaked on the second surface of the optical waveguide 1, so as to improve the utilization ratio of the light source 2.

In some embodiments, an electrode protection layer 8 can be further plated outside the above strip electrodes, and the refractive index of the electrode protection layer 8 is set lower than that of the optical waveguide 1 to thereby avoid the light from being leaked on the second surface of the optical waveguide 1.

In some embodiments, in order to improve the transmittance of the light, the respective electrode structures (the first planar electrode 41, the first pixel electrode 42, the first strip electrodes 44, and the second strip electrode 45) are made of transparent electrodes, e.g., a transparent conductive macromolecule material or an ITO electrode material; and alike, the electrode protection layer 8 is also made of a transparent material.

In some embodiments, in the transparent display panel according to the embodiments of the disclosure, the color rendering component is characterized in that it can render a color upon being excited by the light rays provided by the light source 2, and have a high light transmittance upon receiving no light rays of the light source 2.

Implementations of the color rendering component will be described below by way of an example.

In some embodiments, as illustrated in FIG. 1, the color rendering component can include a photochromic layer 5, where the photochromic layer 5 is colored upon being excited by the light emitted by the light source 2, and colorless and transparent when it is not excited by the light emitted by the light source 2.

By way of an example, the light source 2 can be an ultraviolet light source, that is, ultraviolet light can be exciting light to excite the photochromic layer 5 to be colored to thereby display an image.

The color rendering component (e.g. the photochromic layer 5) can cooperate in operation with the exciting light source 2 for a transparent display effect to thereby satisfy a demand for transparent display. For example, as illustrated in FIG. 1, the transparent display panel displays as follows: a part of the TFT switches 43 are powered as set for an image so that a corresponding part of the pixels at the first group of electrode layers are switched on (the pixel in the dotted circle as illustrated in FIG. 1 is switched on), so a part of the light rays in the optical waveguide 1 can be transmitted to the corresponding area of the photochromic layer 5 through the area of the corresponding part of the pixels at the first liquid crystal layer 3, and thus the area of the photochromic layer 5 on which the light is incident on becomes a display area in which a monochromatic image is displayed. For example, the light rays in the dotted circle in FIG. 1 reach the photochromic layer 5 through the first liquid crystal layer 3, and excite the corresponding area of the photochromic layer 5 to be colored so that the pixel circled by the dotted circle becomes a display pixel.

In some embodiments, the color rendering component can include a color filter layer, and under this case, the light source 2 can be a white light source. In some embodiments, the color filter layer can include red, green, and blue color filters, each of which corresponds to a pixel; and white light emitted by the white light source 2 is filtered respectively by the red, green, and blue color filters significantly different from natural light being filtered respectively by the red, green, and blue color filters, so an image can be displayed in color after the white light source passes the color filter layer. Further, unlike a display effect of a general LCD display panel, the display panel according to the embodiments of the disclosure has a transparent display effect, and there is no change in grayscale of an image displayed on the display panel.

In some embodiments, as illustrated in FIG. 2 and FIG. 3, the color rendering component can be a liquid crystal light-adjusting component which can include a polymer dispersing liquid crystal layer 6 and a second group of electrode layers, where the second group of electrode layers is configured to provide the polymer dispersing liquid crystal layer 6 with an electric field, and the polymer dispersing liquid crystal layer 6 is configured to be driven by the electric field provided by the second group of electrode layers to be switched between a light scattering state and a transparent state. In some embodiments, the liquid crystal light-adjusting component including the polymer dispersing liquid crystal layer 6 and the second group of electrode layers is configured to control visible light to or not to be colored, that is, if the visible light is scattered by polymer dispersing liquid crystals, then an observer will see a colored image; otherwise, the observer will not see any colored image.

In some embodiments, the light source 2 can produce monochromatic visible light. In some embodiments, when the polymer dispersing liquid crystal layer 6 in the liquid crystal light-adjusting component is in the scattering state, the monochromatic visible light rays emitted by the light source 2 are incident on the polymer dispersing liquid crystal layer 6 so that a monochromatic image can be displayed.

In some embodiments, the light source 2 can produce monochromatic visible light in one or more colors so that an image can be displayed in one of the different colors as needed.

In some embodiments, the light source 2 can be configured to produce visible light in one or more of the three primary colors, i.e., red, green, and blue, sequentially at a set frequency in an image display period, where the frequency is higher than a Critical Fusion Frequency (CFF) of human eyes, and the CFF refers to a frequency when a sense of flicking exactly disappears. While the light rays are flicking at a higher frequency than the CFF, a visual retention effect will appear, that is, even if an image disappears or changes, it will be retained for a moment in a person's brain instead of disappearing or changing immediately; and further, the flicking light rays in the respective colors perceived by the human eyes are finally integrated into monochromatic light rays in the brain in an image display period due to the visual retention effect. For example, if red and green light flicking at a high frequency is perceived by the human eyes in an image display period, then the brain may determine the color perceived by the human eyes as yellow, and if red and blue light flicking at a high frequency is perceived by the human eyes in another image display period, then the brain may determine the color perceived by the human eyes as magenta; and further, the light source 2 is arranged as described above so that the transparent display panel can display an image in one of a larger number of colors. In addition, in the embodiments of the disclosure, the refresh frequency of the light source 2 can be higher than or equal to 120 Hz.

In some embodiments, the second group of electrode layers controls the polymer dispersing liquid crystal layer 6 under the same principle as the principle for the first group of electrode layers to control the first liquid crystal layer 3, for example, also by forming a plurality of pixel switches to control the liquid crystal layer except that the second group of electrode layers is configured to switch the polymer dispersing liquid crystals in the respective pixel regions between the optically scattering state and transmission state to thereby control the respective pixel regions to or not to render a color, so the second group of electrode layers can decide the appearance of an image together with the first group of electrode layers.

In some embodiments, there may be also the following two implementations of the second group of electrode layers like the first group of electrode layers: in a first implementation as illustrated in FIG. 2, the second group of electrode layers includes a second planar electrode 71 and a second pixel electrode 72, and in some embodiments, the second planar electrode 71 and the second pixel electrode 72 are arranged respectively on two sides of the polymer dispersing liquid crystal layer 6, where the second pixel electrode 72 includes second electrode blocks arranged in an array, and each second electrode block controls an electric signal to be input, using a TFT switch 73; in a second implementation as illustrated in FIG. 3, the second group of electrode layers includes a plurality of third strip electrodes 74, and a plurality of fourth strip electrodes 75, where the third strip electrodes 74 and the fourth strip electrodes 75 are intersected with each other, and in some embodiments, the third strip electrodes 74 and the fourth strip electrodes 75 are arranged respectively on two sides of the polymer dispersing liquid crystal layer 6.

With the second group of electrode layers above, the Polymer Dispersing Liquid Crystals (PDLCs) in the respective pixel regions can be switched between the scattering state and the transmission state to thereby decide whether the PDLCs in the respective pixel regions can render a color upon acceptance of the light rays emitted by the light source 2.

In some embodiments, in the first implementation of the second group of electrode layers as illustrated in FIG. 2, the second electrode blocks in the second pixel electrode 72 correspond to the first electrode blocks in the first pixel electrode 42 in a one-to-one manner, and orthographic projections of the first electrode blocks onto the optical waveguide 1 overlap with orthographic projections of their corresponding second electrode blocks onto the optical waveguide 1. Stated otherwise, the number and the positions of pixel units defined by the first group of electrode layers exactly correspond to those of pixel units defined by the second group of electrode layers, or the pixel units defined in the liquid crystal optical switches correspond to the pixel units defined in the liquid crystal light-adjusting component in a one-to-one manner, and the former exactly match with the latter.

In some embodiments, in the second implementation of the second group of electrode layers as illustrated in FIG. 3, the plurality of second strip electrodes 45, and the plurality of fourth strip electrodes 75 can be shared electrodes. In some embodiments, the first strip electrodes 44 correspond to the third strip electrodes 74 in a one-to-one manner, and orthographic projections of the first strip electrodes 44 onto the optical waveguide 1 overlap with orthographic projections of their corresponding third strip electrodes 74 onto the optical waveguide 1. At this time, the number and the positions of the pixel units defined by the first group of electrode layers also exactly correspond to those of pixel units defined by the second group of electrode layers.

In some embodiments, when the pixel units defined by the first group of electrode layers are arranged corresponding to the pixel units defined by the second group of electrode layers in a one-to-one manner, a pair of corresponding pixel units can be referred to as a pixel unit in the transparent display panel. At this time, for example, the transparent display panel as illustrated in FIG. 2 can display as follows: for a pixel unit in the transparent display panel, when the TFT switch 43 corresponding to the pixel unit at the first group of electrode layers is switched on, the TFT switch 73 corresponding to the pixel unit at the second group of electrode layers is also switched on, so that the liquid crystal optical switch in the pixel unit is switched on, and the polymer dispersing liquid crystals is in a light scattering state. At this time, as illustrated by the pixel unit circled by the dotted circle in FIG. 2, light rays can be output in the area in the optical waveguide 1 corresponding to the pixel unit, and incident on the area at the polymer dispersing liquid crystal layer 6 corresponding to the pixel unit through the first liquid crystal layer 3, and can be scattered by the polymer dispersing liquid crystals in the area, so that the pixel unit can appear as a display pixel. On the contrary, for a pixel unit in the transparent display panel, when the TFT switch 43 corresponding to the pixel unit at the first group of electrode layers is switched off, the TFT switch 73 corresponding to the pixel unit at the second group of electrode layers is also switched off, that is, the liquid crystal optical switch in the pixel unit is switched off, and the polymer dispersing liquid crystals are optically transparent; and at this time, no light rays are output in the area in the optical waveguide 1 corresponding to the pixel unit, and background light can enter the eyes of the viewer through the optical waveguide 1, the first liquid crystal layer 3, the polymer dispersing liquid crystal layer 6, etc., sequentially, so that the pixel unit can appear as a transparent pixel. In summary, the first group of electrode layers and the second group of electrode layers can cooperate with each other in synchronization to thereby decide the appearance of a display image for a desirable display effect.

Of course, in the transparent display panel according to the embodiments of the disclosure, the pixel units at the first group of electrode layers alternatively may not be arranged corresponding to the pixel units at the second group of electrode layers in a one-to-one manner, and for example, each pixel unit at the second group of electrode layers may correspond to and match with a plurality of pixel units at the first group of electrode layers, and at this time, any one of the pixel units at the first group of electrode layers (the TFT switch 43) is switched on, the corresponding pixel unit at the second group of electrode layers (the TFT switch 73) is switched on.

As illustrated in FIG. 1 to FIG. 3, in some embodiments, the transparent display panel according to the embodiments of the disclosure can further include a first glass substrate 91 between the first liquid crystal layer 3 and the color rendering component, where the first glass substrate 91 can provide a supporting and protecting function. In some embodiments, as illustrated in FIG. 2, the first pixel electrode 42, the TFT switches 43, etc., at the first group of electrode layers can be formed on a side of the first glass substrate 91 facing the first liquid crystal layer 3, and alike, the second pixel electrode 72, the TFT switches 73, etc., at the second group of electrode layers can be formed on a side of the first glass substrate 91 facing the polymer dispersing liquid crystal layer 6; or the strip electrodes shared by the first group of electrode layers and the second group of electrode layers (e.g., the strip electrodes 45 and 75 in FIG. 3) can be arranged on the first glass substrate 91.

As illustrated in FIG. 1 to FIG. 3, in some embodiments, the transparent display panel according to the embodiments of the disclosure can further include a second glass substrate 92 on a side of the color rendering component facing away from the first glass substrate 91, where the second glass substrate 92 can also provide a supporting and protecting function. Further, a light-absorbing layer or a reflecting layer 920 can be arranged on a side surface of the second glass substrate 92 to thereby avoid light from being leaked through the side surface.

Based upon the same inventive concept, the embodiments of the disclosure further provide a display device including the transparent display panel according to any one of the embodiments above of the disclosure.

In some embodiments, the display device can be applicable in the fields of shop windows, intelligent home appliances, etc.

Based upon the same inventive concept, the embodiments of the disclosure further provide a method for driving the transparent display panel according to any one of the embodiments above of the disclosure, where the method includes the following operations.

As illustrated in FIG. 1 to FIG. 3, while the transparent display panel is in a display state: the light source 2 is switched on so that parallel light emitted by the light source 2 enters the optical waveguide 1, and is totally reflected in the optical waveguide 1; the first group of electrode layers creates a first electric field so that the refractive index of the first liquid crystal layer 3 in a set pixel region is higher than that of the optical waveguide 1, so the light rays in the optical waveguide 1 corresponding to the set pixel region are output through the first liquid crystal layer 3; and the color rendering component renders a color upon being excited by the light output by the first liquid crystal layer 3.

In some embodiments, the "light rays in the optical waveguide 1 corresponding to the set pixel region" refers to light rays in the optical waveguide 1, which are incident on the set pixel region on a first surface of the optical waveguide 1.

In some embodiments, as illustrated in FIG. 2 and FIG. 3, when the color rendering component is a liquid crystal light-adjusting component, while the transparent display panel is in a display state, the second group of electrode layers creates a second electric field so that the set pixel region of the polymer dispersing liquid crystal layer 6 changes into a scattering state, so the light rays reaching the polymer dispersing liquid crystal layer 6 through the first liquid crystal layer 3 are scattered in the set pixel region.

In some embodiments, the set pixel region in the respective embodiments above is a pixel region for displaying, e.g., the pixel region in the dotted circle as illustrated in FIG. 1 and FIG. 2, and the other pixel regions than the set pixel region are transparent areas.

In some embodiments, while the transparent display panel is in a display state, the light source 2 can be configured to produce linear monochromatic light, linear white light, or linear ultraviolet light in an image display period, or the light source 3 can be configured to produce sequential monochromatic light in an image display period, for example, the light source can produce visible light in one or more of the three primary colors, i.e., red, green, and blue, sequentially at a set frequency, where the set frequency is higher than a critical fusion frequency of human eyes.

Evidently those skilled in the art can make various modifications and variations to the disclosure without departing from the spirit and scope of the disclosure. Thus, the disclosure is also intended to encompass these modifications and variations thereto so long as the modifications and variations come into the scope of the claims appended to the disclosure and their equivalents.

The invention claimed is:

1. A transparent display panel, comprising a light source, an optical waveguide, a first liquid crystal layer, a first group of electrode layers, and a color rendering component, wherein:
   the optical waveguide, comprising opposite first and second surfaces, and a side surface connected between the first and second surfaces, is on a side of the first liquid crystal layer, and has its first surface come into contact with the first liquid crystal layer;
   the color rendering component is on another side of the first liquid crystal layer, and configured to render a color upon being excited by light emitted by the light source;
   the light source is on the side surface of the optical waveguide, and configured to emit parallel light toward an area between the first and second surfaces; and
   the first group of electrode layers is configured to provide the first liquid crystal layer with an electric field;
   wherein when a refractive index of the first liquid crystal layer in a set pixel region is higher than that of the optical waveguide, the parallel light, corresponding to the set pixel region, in the optical waveguide exits from the first surface of the optical waveguide, or,
   when a refractive index of the first liquid crystal layer in a set pixel region is lower than that of the optical waveguide, the parallel light, corresponding to the set pixel region, in the optical waveguide is totally reflected on the first surface side of the optical waveguide;
   wherein the first group of electrode layers comprises a first planar electrode, the first planar electrode comes into contact with the second surface of the optical waveguide, and a refractive index of the first planar electrode is lower than that of the optical waveguide; or
   the first group of electrode layers comprises a plurality of first strip electrodes, the plurality of first strip electrodes come into contact with the second surface of the optical waveguide, and refractive indexes of the plurality of first strip electrodes are lower than that of the optical waveguide.

2. The transparent display panel according to claim 1, wherein the color rendering component comprises a photochromic layer.

3. The transparent display panel according to claim 2, wherein the light source is an ultraviolet light source.

4. The transparent display panel according to claim 1, wherein the light source is a white light source, and the color rendering component comprises a color filter layer.

5. The transparent display panel according to claim 1, wherein the first group of electrode layers further comprises a first pixel electrode, and the first pixel electrode comprises first electrode blocks arranged in an array; or the first group of electrode layers further comprises a plurality of second strip electrodes, and the plurality of first strip electrodes and the plurality of second strip electrodes are intersected with each other.

6. The transparent display panel according to claim 5, wherein the first planar electrode is on a side of the second surface of the optical waveguide, and the first pixel electrode is on a side of the first liquid crystal layer facing away from the optical waveguide; or the plurality of first strip electrodes are on a side of the second surface of the optical waveguide, and the plurality of second strip electrodes are on a side of the first liquid crystal layer facing away from the optical waveguide.

7. The transparent display panel according to claim 5, wherein the light source is a monochromatic light source; and the color rendering component comprises a polymer dispersing liquid crystal layer and a second group of electrode layers;

the second group of electrode layers is configured to provide the polymer dispersing liquid crystal layer with an electric field; and the polymer dispersing liquid crystal layer is configured to be driven by the electric field provided by the second group of electrode layers to be switched between a light scattering state and a transparent state.

8. The transparent display panel according to claim 7, wherein the second group of electrode layers comprises a second planar electrode and a second pixel electrode;

the second planar electrode and the second pixel electrode are on two sides of the polymer dispersing liquid crystal layer respectively, and the second pixel electrode comprises second electrode blocks arranged in an array.

9. The transparent display panel according to claim 8, wherein the second electrode blocks correspond to the first electrode blocks in a one-to-one manner; and orthographic projections of the first electrode blocks onto the optical waveguide overlap with orthographic projections of their corresponding second electrode blocks onto the optical waveguide.

10. The transparent display panel according to claim 8, wherein the second group of electrode layers comprises a plurality of third strip electrodes and a plurality of fourth strip electrodes; and the plurality of third strip electrodes and the plurality of fourth strip electrodes are intersected with each other, and are on two sides of the polymer dispersing liquid crystal layer respectively.

11. The transparent display panel according to claim 10, wherein the plurality of second strip electrodes, and the plurality of fourth strip electrodes are shared electrodes; and the plurality of first strip electrodes correspond to the plurality of third strip electrodes in a one-to-one manner, and orthographic projections of the plurality of first strip electrodes onto the optical waveguide overlap with orthographic projections of their corresponding third strip electrodes onto the optical waveguide.

12. The transparent display panel according to claim 1, wherein inner mirror reflecting layers are arranged on the other side surfaces of the optical waveguide than the side surface thereof arranged with the light source.

13. The transparent display panel according to claim 1, wherein the transparent display panel further comprises a linear polarizer between the optical waveguide and the light source.

14. The transparent display panel according to claim 1, wherein the transparent display panel further comprises:

a first glass substrate between the first liquid crystal layer and the color rendering component; and a second glass substrate on a side of the color rendering component facing away from the first glass substrate.

15. A display device, comprising the transparent display panel according to claim 1.

16. A method for driving the transparent display panel according to claim 1, comprising:

while the transparent display panel is in a display state:

switching on the light source so that parallel light emitted by the light source enters the optical waveguide, and is totally reflected in the optical waveguide;

creating, by the first group of electrode layers, a first electric field to make a refractive index of the first liquid crystal layer in a set pixel region being higher than that of the optical waveguide, so that the parallel light in the optical waveguide corresponding to the set pixel region is output through the first liquid crystal layer; and rending, by the color rendering component, a color upon being excited by the light output by the first liquid crystal layer.

17. The driving method according to claim 16, wherein the color rendering component comprises a polymer dispersing liquid crystal layer and a second group of electrode layers; and while the transparent display panel is in the display state, the light source produces visible light in one or more of three primary colors comprising red, green, and blue sequentially at a set frequency in an image display period, wherein the set frequency is higher than a critical fusion frequency of human eyes.

* * * * *